Feb. 22, 1949.

L. A. WOOTEN 2,462,245

SPACE DISCHARGE DEVICE

Filed Aug. 25, 1942

INVENTOR
L. A. WOOTEN
BY
Stanley B. Kent.
ATTORNEY

Patented Feb. 22, 1949

2,462,245

UNITED STATES PATENT OFFICE 2,462,245

SPACE DISCHARGE DEVICE

Leland A. Wooten, Maplewood, N. J., assignor to Bell Telephone Laboratories, Incorporated, New York, N. Y., a corporation of New York Application August 25, 1942, Serial No. 456,004

7 Claims. (Cl. 250—165)

This invention relates to space discharge devices and more particularly to photoelectric tubes.

An object of the invention is to improve the production of electron discharge devices, an example of which is a photoelectric tube.

Another object is to provide an improved method of producing a metallic vapor by chemical reaction of a mixture comprising finely divided aluminum.

In an example of practice illustrative of this invention a structure suitable for conversion into a photoelectric tube comprises an evacuable glass container, a plurality of electrodes and a caesium producing pellet containing an intimate mixture of finely divided caesium chromate, chromic oxide, aluminum and cuprous oxide. In the process of sensitizing one of the electrodes to render it photoelectrically emissive, the container is evacuated, the electrode to be sensitized is prepared for treatment with caesium and the caesium producing pellet is heated to initiate an exothermic reaction which is carried to completion by the heat produced by the reaction and all of the caesium is released in the form of vapor. The uniformity of this reaction is greatly improved by the presence of the cuprous oxide. It is believed that the cuprous oxide enters into the reaction to produce the improved results in two ways. The first effect is to reduce the amount of initial heating required to start the reaction over that which would be required if the cuprous oxide were not mixed with the other ingredients because cuprous oxide reacts with finely divided aluminum at a lower temperature than does chromic oxide. The reaction of cuprous oxide with the aluminum is an exothermic reaction which produces additional heat to facilitate further the exothermic reaction of the chromic oxide with the aluminum. The second effect, probably the more important of the two, is to keep the surfaces of the aluminum particles clean throughout the reaction by the action of the free copper produced by the reduction of the cuprous oxide. The copper may prevent the aluminum particles from becoming coated with a protective film of aluminum oxide possibly by formation of a copper-aluminum alloy, or the copper may serve as a catalyst for the reaction. Whatever may be the true explanation the presence of the cuprous oxide in the reactive mixture improves the reaction so that all of the caesium originally in the form of caesium chromate is uniformly released in the form of caesium vapor. This makes possible the manufacture of photoelectric tubes with a small percentage of defective tubes with resulting improvement in economy of production.

Other metallic compounds of metals more positive than aluminum in the electromotive force series may be used in place of caesium and other compounds which enter into an exothermic reaction with aluminum may be used in place of the chromates of such metals and chromic oxide for certain purposes. The other alkali metals, the alkaline earth metals and magnesium may be specifically mentioned.

This invention will now be described in more detail having reference to the accompanying drawing.

Like reference characters are used to refer to identical elements in the figures of the drawing.

Figure 1:
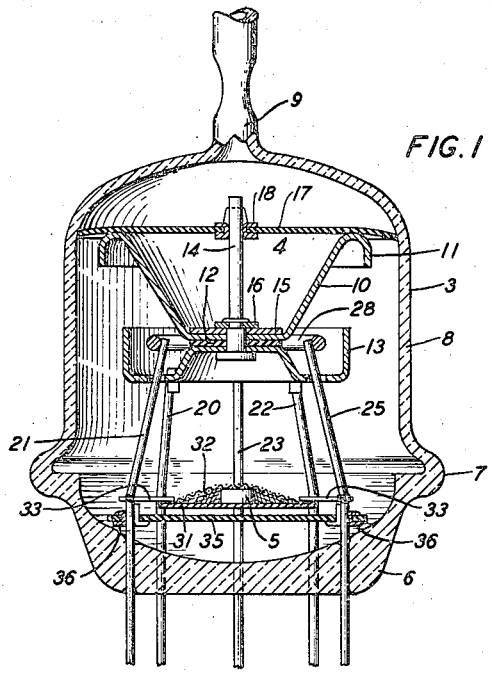
Fig. 1 is a longitudinal section of an embodiment of the invention in a structure suitable for conversion into a photoelectric tube.

The embodiment of the invention illustrated in Fig. 1 is a so-called "seal-in" for a photoelectric tube. The seal-in, as the term is used in this specification, is a fabricated tube structure ready to be put through a sensitization process which converts the seal-in from a non-photoelectric device to a photoelectric tube. The seal-in of Fig. 1 comprises a glass container 3 consisting of a generally cylindrical portion 8 and a molded dished stem 6 joined by a ring seal 7, an electrode structure 4 supported from the molded dished stem 6 and a caesium producing pellet 5 suitably mounted in proximity to the electrode structure. Pellet 5 is composed of an improved mixture of chemical ingredients which react with an exothermic reaction to produce a uniform amount of caesium vapor within the evacuated container 3. One such improved mixture comprises caesium chromate ($Cs_2CrO_4$), chromic oxide ($Cr_2O_3$) and an active cuprous oxide-aluminum mixture which latter mixture consists of commercial powdered aluminum (Al) thoroughly mixed with a small per cent of cuprous oxide ($Cu_2O$) by rolling in a ball mill using flint pebbles. The amount of cuprous oxide may be varied within rather wide limits extending from 0.10 per cent to one per cent of the amount of aluminum powder by weight. Very good results are obtained by mixing with the aluminum powder an amount of cuprous oxide equal to 0.5 per cent of the weight of the aluminum powder. A suitable mixture for making caesium producing pellets comprises five grams of $Cs_2CrO_4$, 31.8 grams of $Cr_2O_3$ and 14.212 grams of an active cuprous oxide-aluminum mixture. The amount of active cuprous oxide-aluminum mixture used may be varied considerably provided that there is sufficient aluminum present to completely reduce the caesium chromate and chromic oxide. A suitable mixture expressed in per cent of the ingredients by weight comprises 9.8 per cent of caesium chromate, 62.4 per cent of chromic oxide, 27.62 per cent of powdered aluminum and 0.138 per cent of cuprous oxide, all of said ingredients being finely divided and thoroughly mixed.

The caesium producing mixture is formed into pellets by pressure in a mold. These pellets are then mounted to form part of the seal-in illustrated in Fig. 1. The electrode structure 4 comprises a cathode 10 which is formed advantageously from substantially pure silver in the shape of a frustrum of a cone, the large end of the cone being spun over to form a focussing and shielding rim 11. The convex conical surface of the cathode 10 in the completed photoelectric tube is treated to make it photoelectrically sensitive. The small end of the cathode 10 is turned in against one surface of a mica washer 12, the other surface of which fits against an annular metallic shield 13. The cathode 10, washer 12 and shield 13 are held together by a long shank rivet 14, nickel washer 15 and nickel clamping washer 16. The washer 16 is forced over a beveled section of the shank of rivet 14 thereby providing a tight fit and a portion of the beveled section is sheared down and forced over the washer 16 by the riveting tool. A mica disc 17 provided with a center eyelet 18 rests on the spun-over end of cathode 10, the shank of rivet 14 passing through the eyelet 18 and being welded thereto. Shield 13 is supported on four lead-in conductors which are sealed through the dished stem 6 at positions equally spaced on a circle centered at the center of the stem. Conductors 20 and 22 only are shown in the drawing. The anode 28 is a nickel ring of circular cross section supported on four lead-in conductors also sealed through the dish stem 6 at positions on the same circle as the conductors supporting the shield 13 but midway between those conductors respectively. Three of these lead-in conductors 21, 23 and 25 are shown in the drawing. The anode 28 is so positioned with respect to the cathode 10, the shielding rim 11 and the shield 13, that the electrons emitted from the surface of the cathode 10 are focussed on the anode 28 and prevented from accumulating on the glass walls of the container 8 and other insulating surfaces to cause noise during the operation of the tube. The shape of the cathode 10 and shield 13 is such as to facilitate focussing.

Figure 2:
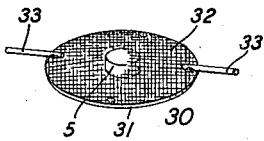
Fig. 2 shows a mounted caesium producing pellet according to this invention.

The caesium producing pellet 5 is mounted in a holder 30 shown in perspective in Fig. 2 comprising a nickel disc 31 and nickel gauze disc 32 welded together at four equally spaced positions around the periphery of the discs, two of these welds at diametrically opposite positions including support wires 33. The gauze disc 32 is shown partially cut away in Fig. 2 to expose the pellet 5. The gauze disc 32 is resilient and when welded to the disc 31 holds the pellet 5 firmly against the disc 31. The support wires 33 are welded respectively to the anode support wires 21 and 25 transversely to the axis of the seal-in and a small distance from the dished stem 6. In order that the length of the container 3 may be made as small as possible, pellet holder 30 is located very close to the dished stem 6. In fact, it is placed so close that the stem would be injured if means were not provided to prevent such injury during the chemical reaction of the caesium pellet 5. To prevent injury another mica disc 35 is supported from the anode support wires through the intermediary of eyelets 36 through which the support wires pass and to which they are welded. The cathode support wires pass through notches in the edge of disc 35 and do not touch the disc.

The seal-in is completed by the glass portion 8 which covers the electrode structure and is joined to the glass stem 6 at the ring seal 7. The portion 8 is pressed down so that the edges of mica disc 17 contact the inner surface of the portion 8 and are slightly depressed thereby. Exhaust tubulation 9 is adapted to be connected to a suitable pump station of well-known type during the sensitizing process when the seal-in is converted into a photoelectric tube.

Cathode 10 may be sensitized in any well-known manner after the seal-in has been fabricated. Briefly described an advantageous method of sensitizing the cathode is as follows:

The seal-in is baked in an oven at about 400° C. to remove occluded gas from the bulb but this heating does not cause any chemical reaction in the caesium pellet 5. Oxygen is admitted into the container and the cathode is subjected to ionic bombardment in such a way as to produce a heavy layer of silver oxide on the convex surface of the conical cathode 10. The residual oxygen is then pumped out and the cathode inductively heated by means of a high frequency coil surrounding the container to reduce the heavy layer of silver oxide. This cycle of oxidation and reduction is repeated. This treatment leaves the convex surface of the cathode 10 clean and slightly rough so that it has a uniform matte surface. The surface of the nickel shield 13 remains unchanged. A fresh charge of oxygen is admitted and by a succession of discharges of fixed amounts of electricity from condensers the convex surface of the cathode is oxidized to an amount depending upon the amount of caesium to be introduced. The mica disc 17 functions to prevent discharges to the inner surface of the conical cathode 10 and thus facilitates the oxidation of the convex surface thereof. The caesium pellet 5 is then inductively heated to effect a chemical reaction which produces caesium vapor. This is commonly called flashing the caesium. The high frequency coil used for inductively heating the caesium pellet holder 30 is positioned around the stem 6 with the upper end of the coil at approximately the level of the holder 30. In order to protect the cathode 10 from induced currents a short-circuiting turn in the form of a short length of copper tubing is placed around the cylindrical portion 8 of the container with the lower end at the level of the shield 13. A certain amount of heating of the shield 13 takes place nevertheless but such heating is prevented from injuring the oxidized cathode 10 by the mica disc 12 which greatly reduces the conduction of heat from the shield 13 to the cathode 10. Caesium vapor produced by the chemical reaction condenses primarily on the inner wall of the glass container and is prevented from directly striking the oxidized surface of the silver cathode 10 by the shield 13. The container is then heated in a stream of hot air to a temperature of about 225° C. until the cathode has reached the desired sensitivity. Argon or other suitable gases may be admitted at low pressure to obtain the benefits of gas amplification. A modified method of sensitization may be used in which argon or other suitable gas is admitted immediately after flashing the caesium and the tube sealed off. A subsequent heat treatment, dissociated from the pump station completes the sensitization.

The amount of caesium producing mixture which is used in the seal-in depends upon the amount of caesium required to produce the desired sensitivity. The cuprous oxide may be mixed with the other ingredients caesium chromate, chromic oxide and powdered aluminum simply as an added ingredient but best results have been obtained by mixing in the manner hereinbefore described namely by mixing the cuprous oxide with the aluminum powder first to produce an active cuprous oxide-aluminum mixture and then mixing the active cuprous oxide-aluminum mixture with the other ingredients, caesium chromate and chromic oxide. The metal producing mixture may be mounted in a side container connected to the seal-in in such a manner that both the seal-in and the side container may be evacuated through a single pump connection.

The outstanding advantage of this invention is the uniformity of the reaction of the caesium pellets, which uniformity it is believed is made possible by the action of the free copper in keeping the surfaces of the aluminum particles in condition for reaction with the chromic oxide and caesium chromate until the reaction is complete. All of the caesium in the caesium chromate is thus released when the pellet is flashed and since the amount of caesium chromate can be closely controlled the amount of caesium produced is also closely controlled. This close control of the amount of caesium produced makes for uniformity in the sensitivity of photoelectric tubes produced by the use of this invention.

The use of an active cuprous oxide-aluminum mixture is of general application in the production of metallic vapors by chemical reactions in which aluminum powder is used as the reducing agent.

What is claimed is:

1. A caesium producing mixture comprising a caesium compound which reacts with powdered aluminum when heated, powdered aluminum and cuprous oxide.

2. A caesium producing mixture comprising finely divided and intimately mixed caesium chromate, chromic oxide, cuprous oxide and aluminum.

3. A caesium producing mixture comprising a compressed pellet of finely divided and intimately mixed caesium chromate, chromic oxide, cuprous oxide and aluminum.

4. A caesium producing mixture comprising finely divided and intimately mixed caesium chromate, chromic oxide, cuprous oxide and aluminum wherein the amount of cuprous oxide is within the limits of 0.10 per cent and one per cent of the amount of aluminum by weight.

5. A caesium producing mixture comprising by weight 9.8 per cent of caesium chromate, 62.4 per cent of chromic oxide, 27.62 per cent of powdered aluminum and 0.138 per cent of cuprous oxide all of said ingredients being finely divided and thoroughly mixed.

6. A method of sensitizing an electrode within an evacuated container which comprises providing within said container an electrode to be sensitized to emit electrons when externally excited and a mixture of caesium chromate, chromic oxide, cuprous oxide and aluminum in proportions to produce an exothermic reaction, and heating the mixture to the reaction temperature of said mixture producing caesium to sensitize said electrode.

7. A method of producing a caesium producing mixture which comprises thoroughly mixing finely divided aluminum and less than one per cent and more than one-tenth per cent by weight of cuprous oxide in a ball mill using quartz pebbles to produce an active cuprous oxide-aluminum mixture, and subsequently mixing a finely divided caesium containing compound with said active cuprous oxide-aluminum mixture.

LELAND A. WOOTEN.

REFERENCES CITED

The following references are of record in the file of this patent:

UNITED STATES PATENTS

| Number | Name | Date |
|---|---|---|
| 1,707,637 | Miesse | Apr. 2, 1929 |
| 1,733,809 | Lederer | Oct. 29, 1929 |
| 1,797,131 | De Boer | Mar. 17, 1931 |
| 1,835,118 | Marden et al. | Dec. 8, 1931 |
| 1,837,746 | Zworykin | Dec. 22, 1931 |
| 1,860,187 | Koller | May 24, 1932 |
| 1,861,637 | Marden | June 7, 1932 |
| 1,991,774 | Spencer | Feb. 19, 1935 |
| 2,003,344 | De Boer et al. | June 4, 1935 |
| 2,236,647 | McIlvaine | Apr. 1, 1941 |